US012759619B2

(12) United States Patent
Gaunt et al.

(10) Patent No.: US 12,759,619 B2
(45) Date of Patent: Oct. 13, 2026

(54) PROJECTED STEERING CONTROL SYSTEM

(71) Applicant: GM GLOBAL TECHNOLOGY OPERATIONS LLC, Detroit, MI (US)

(72) Inventors: Michael C. Gaunt, Metamora, MI (US); Travis Steve Larson, Washington, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 20 days.

(21) Appl. No.: 18/987,877

(22) Filed: Dec. 19, 2024

(65) Prior Publication Data

US 2026/0175904 A1 Jun. 25, 2026

(51) Int. Cl.
*B62D 5/04* (2006.01)

(52) U.S. Cl.
CPC .................................... *B62D 5/046* (2013.01)

(58) Field of Classification Search
CPC ..................................................... B62D 5/046
USPC ........................................ 701/41, 42, 43, 44
See application file for complete search history.

(56) References Cited

U.S. PATENT DOCUMENTS 6,363,305 B1 3/2002 Kaufmann et al.
6,505,703 B2 * 1/2003 Stout ...................... B62D 6/008 701/41
7,295,905 B2 11/2007 Yao et al.
7,325,644 B2 * 2/2008 Sakai .................. B62D 5/0469 701/41
8,880,295 B2 11/2014 Champagne et al.
11,052,940 B1 * 7/2021 Narasimhan ........... B62D 6/008
2020/0398893 A1 12/2020 Shoji et al.

FOREIGN PATENT DOCUMENTS

DE 102020118419 A1 2/2021

OTHER PUBLICATIONS

German Office Action from counterpart DE1020251037876, dated Sep. 9, 2025.

* cited by examiner

*Primary Examiner* — Hai H Huynh

(57) ABSTRACT

A steering control system for a vehicle includes a hand wheel actuator (HWA), sensors configured to sense an HWA angle and HWA torque. A road wheel actuator (RWA) controls at least one of an RWA angle and an RWA velocity of a road wheel of the vehicle. When the HWA angle is greater than a predetermined HWA angle, the steering controller is configured to perform at least two of use a first model or lookup table to generate a first RWA angle in response to the HWA angle, use a second model or lookup table to generate a second RWA angle in response to the HWA torque, use a third model or lookup table to generate a first RWA velocity in response to the HWA angle, and use a fourth model or lookup table to generate a second RWA velocity in response to the HWA torque.

20 Claims, 7 Drawing Sheets

PROJECTED STEERING CONTROL SYSTEM

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicles, and more particularly to steering control systems for vehicles.

Vehicles include steering control systems such as manual steering systems, hydraulic power steering systems, electronic power steering systems, and steer-by-wire steering (SbW) systems. In manual steering systems, the steering wheel directly causes rotation of the front wheels without power assistance. In hydraulic and electronic power steering systems, the steering wheel directly causes rotation of the front wheels with hydraulic or electronic power assistance. In SbW systems, a rotational angle of a hand wheel actuator is used to control a road wheel actuator that turns front wheels of the vehicles without a direct connection.

SUMMARY

A steering control system for a vehicle includes a first sensor configured to sense a hand wheel actuator (HWA) angle, and a second sensor configured to sense an HWA torque. A steering controller is configured to receive the HWA angle and the HWA torque. When the HWA angle is greater than a predetermined HWA angle, the controller is configured to perform at least two of use a first model or lookup table to generate a first road wheel actuator (RWA) angle in response to the HWA angle, use a second model or lookup table to generate a second RWA angle in response to the HWA torque, use a third model or lookup table to generate a first RWA velocity in response to the HWA angle, and use a fourth model or lookup table to generate a second RWA velocity in response to the HWA torque. A RWA controller is configured to determine at least one of a RWA angle and a RWA velocity in response to at least two of the first RWA angle multiplied by a first gain, the second RWA angle multiplied by a second gain, the first RWA velocity multiplied by a third gain, and the second RWA velocity multiplied by a fourth gain.

In other features, at least one of the steering controller and the RWA controller is configured to sum the first RWA angle and the second RWA angle. At least one of the steering controller and the RWA controller is configured to sum the first RWA velocity and the second RWA velocity. The RWA controller is configured to generate the RWA angle and the RWA velocity in response to the first RWA angle multiplied by the first gain, the second RWA angle multiplied by the second gain, the first RWA velocity multiplied by the third gain, and the second RWA velocity multiplied by the fourth gain.

In other features, at least one of the steering controller and the RWA controller is configured to sum the first RWA angle and the second RWA angle. At least one of the steering controller and the RWA controller is configured to sum the first RWA velocity and the second RWA velocity.

In other features, the steering controller is configured to monitor enabling criteria and to enable use of the first model or lookup table, the second model or lookup table, the third model or lookup table, and the fourth model or lookup table when the enabling criteria are met. The steering controller is configured to monitor disabling criteria and to disable use of the first model or lookup table, the second model or lookup table, the third model or lookup table, and the fourth model or lookup table when the disabling criteria are met. At least one parameter of the disabling criteria is selected to provide hysteresis.

In other features, the enabling criteria include two or more selected from a group consisting of an absolute value of the HWA angle is greater than a first predetermined angle, the HWA torque is greater than a predetermined torque, an electronic stability control module is active, an absolute value of a road wheel angle is less than a second predetermined angle, and vehicle speed is greater than a predetermined speed.

In other features, the predetermined speed is in a range from 8 to 20 kilometers per hour (kph). The absolute value of the first predetermined angle is in a range from 140° to 180°. The predetermined torque is in a range from 3 to 8 Nm. The absolute value of the second predetermined angle is in a range from 25° to 35°.

In other features, a feedback motor is configured to adjust feedback on the HWA when the HWA angle is greater than a predetermined HWA angle.

A steering control system for a vehicle includes a first sensor configured to sense a hand wheel actuator (HWA) angle, and a second sensor configured to sense an HWA torque. A steering controller is configured to receive the HWA angle and the HWA torque. When the HWA angle is greater than a predetermined HWA angle and enabling criteria are met, the steering controller is configured to use a first model or lookup table to generate a first road wheel actuator (RWA) angle in response to the HWA angle, use a second model or lookup table to generate a second RWA angle in response to the HWA torque, use a third model or lookup table to generate a first RWA velocity in response to the HWA angle, and use a fourth model or lookup table to generate a second RWA velocity in response to the HWA torque. A RWA controller configured to determine a RWA angle and a RWA velocity in response to the first RWA angle multiplied by a first gain, the second RWA angle multiplied by a second gain, the first RWA velocity multiplied by a third gain, and the second RWA velocity multiplied by a fourth gain.

In other features, at least one of the steering controller and the RWA controller is configured to sum the first RWA angle and the second RWA angle and to sum the first RWA velocity and the second RWA velocity.

In other features, the steering controller is configured to monitor disabling criteria and to disable use of the first model or lookup table, the second model or lookup table, the third model or lookup table, and the fourth model or lookup table when the disabling criteria are met. At least one parameter of the disabling criteria is selected to provide hysteresis.

In other features, the enabling criteria includes an absolute value of the HWA angle is greater than a first predetermined angle, the HWA torque is greater than a predetermined torque, an electronic stability control module is active, an absolute value of a road wheel angle is less than a second predetermined angle, and vehicle speed is greater than a predetermined speed.

In other features, the predetermined speed is in a range from 8 to 20 kilometers per hour (kph), and the absolute value of the first predetermined angle is in a range from 140° to 180°.

In other features, the predetermined torque is in a range from 3 to 8 Nm, and the absolute value of the second predetermined angle is in a range from 25° to 35°.

In other features, a feedback motor is configured to adjust feedback on the HWA when the HWA angle is greater than a predetermined HWA angle.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Steer-by-wire (SbW) systems include a hand wheel actuator (HWA) that is connected to and receives rotational input from a steering wheel or yoke. The SbW systems also include a road wheel actuator (RWA) that is controlled by rotational inputs to the HWA. SbW systems interpret the rotational inputs to the HWA and generate commands to adjust the RWA to control turning of the front wheels of the vehicle.

A steering wheel in a conventional steering system rotates in a range greater than +/−360°. However, it may be desirable to have a steering device such as a yoke with a more limited rotational range. Steering the vehicle with a steering device having a limited rotational range is more complex. To ensure customer satisfaction, the correlation between steering inputs to the HWA, rotational output of the RWA, and the resulting steering path of the vehicle should be both intuitive and stable at both low and high vehicle speeds.

Some SbW systems use a variable steering ratio allowing rotation of the HWA to vary relative to the rotational output of the RWA and turning of the front wheels. The variable steering ratio allows the rotational range of the HWA to be reduced or limited. For example, the variable ratio enables a first steering ratio at low vehicle speeds and a second steering ratio at high vehicle speeds (e.g., where the first steering ratio is lower than the second steering ratio to reduce steering output at higher speeds). When the variable ratio is used, the rotational range of the steering wheel can be reduced to less than 180° (approximately)+/−150°. Using a smaller rotational range enables the use of yoke-like steering wheels.

The present disclosure relates to a steering control system that is configured to control movement of the RWA with a small amount of additional rotation and/or torque input by the driver when an absolute value of the HWA is greater than a predetermined angle limit.

In some examples, the predetermined HWA angle limit is less than or equal to +/−225°. In some examples, the predetermined HWA angle limit is less than or equal to +/−180°. In some examples, an absolute value of the predetermined HWA angle limit is less than or equal to +/−160°. In some examples, an absolute value of the predetermined HWA angle limit is equal to +/−150°.

Figure 1:
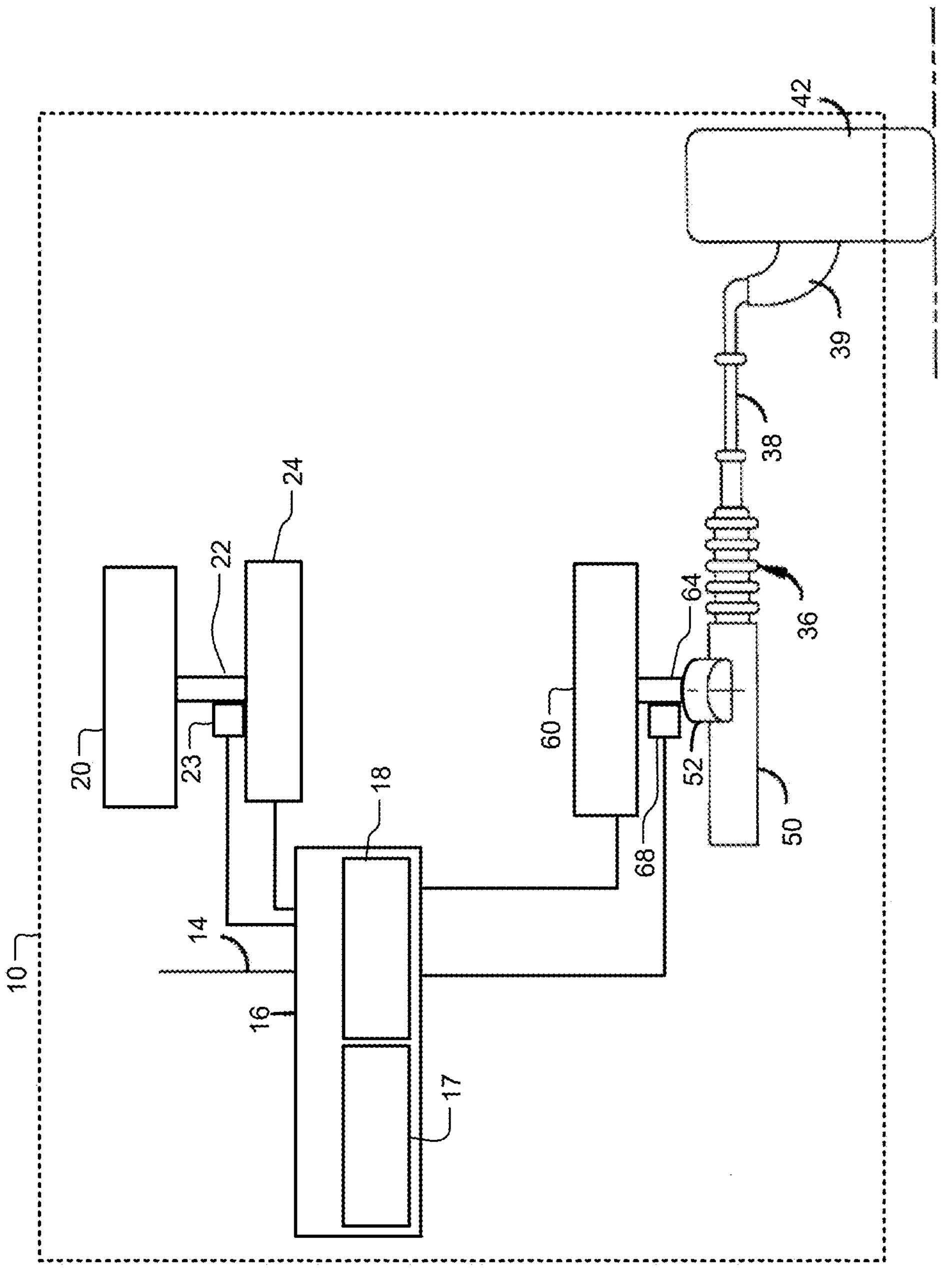
FIG. 1 is a functional block diagram of an example of a steer-by-wire (SbW) system including a hand wheel actuator (HWA) and a road wheel actuator (RWA) according to the present disclosure.

Referring now to FIG. 1, a vehicle 10 including a steer-by-wire (SbW) system according to the present disclosure is shown. A controller 16 includes an electronic stability control (ESC) module 17 configured to provide one or more ESC modes that selectively control braking of wheels of the vehicle using different parameters to increase stability (when enabled) and an optional disabled mode where ESC is not performed. A steering controller 18 is configured to control a road wheel actuator (RWA) 60 in response to rotation of a hand wheel actuator (HWA) 20 as will be described further below. In some examples, the controller 16 receives one or more sensed parameters 14 from a vehicle data bus such as accelerator pedal position, brake pedal position, vehicle speed, wheel speeds, etc.

A driver of the vehicle provides steering inputs using the HWA 20 that rotates relative to a shaft 22. A sensor 23 senses a rotational angle and/or a torque of the HWA 20 and/or the shaft 22. In some examples, a feedback motor 24 is configured to control torque felt by the driver as the HWA 20 is rotated to simulate road feel and/or to provide feedback related to steering ratio changes at high rotational angles.

The vehicle 10 includes a steering mechanism 36 that causes movement of front wheels 42 in response to movement of the HWA 20. In some examples, the steering mechanism 36 includes a rack-and-pinion system, although other steering systems can be used. The rack-and-pinion system includes a toothed rack (not shown) and a pinion gear (also not shown) located inside rack and gear housings 50 and 52. The RWA 60 is configured to rotate a shaft 64 in response to commands from the controller 16. Rotation of the shaft 64 turns the pinion gear. Rotation of the pinion gear moves the rack which moves tie rods 38 connected to steering knuckles 39 and the front wheels 42 (one side shown). A sensor 68 senses an angle of the shaft 64.

Figure 2A:
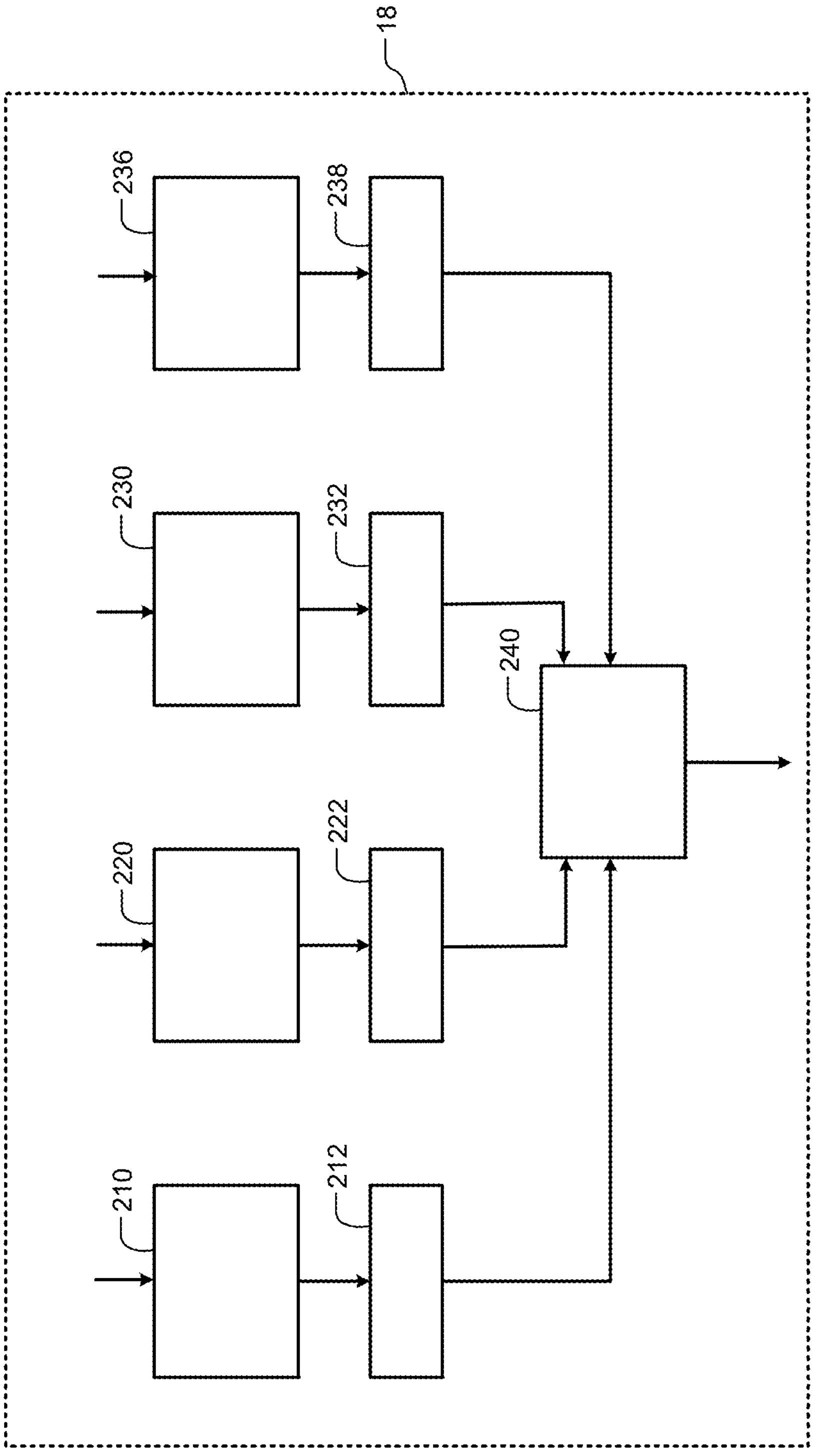
FIGS. 2A and 2B are functional block diagrams of examples of a steering control system according to the present disclosure.

Referring now to FIG. 2A, the steering controller 18 controls movement of the RWA 60 using a first response or ratio(s) when the HWA position is less than a predetermined angle. When the HWA position is greater than the predetermined angle and other enabling criteria are met, the steering controller 18 controls movement of the RWA using a projected response based on HWA angle and/or torque. When using the projected response, a small amount of additional HWA rotation and/or torque input by the driver after the HWA reaches the predetermined limit provides a disproportionate increase in the RWA. The steering controller 18 calculates the RWA angle and/or velocity in response to HWA angle and/or HWA torque. For example, the steering controller 18 uses one or more response curves and one or more corresponding gains to control the RWA angle and/or velocity in response to HWA angle and/or HWA torque.

For example, the steering controller 18 includes a first RWA angle model or lookup table 210 that generates a first RWA angle in response to the measured HWA angle. A gain multiplier 212 multiples the first RWA angle by a first gain. The first gain times the first RWA angle is output by the gain multiplier 212 to a RWA controller 240 configured to control RWA angle and/or velocity.

The steering controller 18 includes a second RWA angle model or lookup table 220 that generates a second RWA angle in response to the measured HWA torque. A gain multiplier 222 multiples the second RWA angle by a second gain. The second gain times the second RWA angle is output by the gain multiplier 222 to the RWA controller 240. In some examples, the RWA controller 240 applies a mathematical function, filter, or other modifier to the first RWA angle and the second RWA angle to generate the RWA angle.

The steering controller 18 includes a first RWA velocity model or LUT 230 that generates a first RWA velocity response in response to the measured HWA angle. A gain multiplier 232 multiples the RWA velocity by a third gain at 232. The third gain times the RWA velocity is output to the RWA controller 240.

The steering controller 18 includes a second RWA velocity model or LUT 236 that generates a second RWA velocity response in response to HWA torque. A gain multiplier 238 multiples the RWA torque by a fourth gain. The fourth gain times the RWA velocity is output to the RWA controller 240. In some examples, the RWA controller 240 applies a mathematical function, filter, or other modifier to the first RWA velocity and the second RWA velocity to generate the RWA velocity.

Figure 2B:
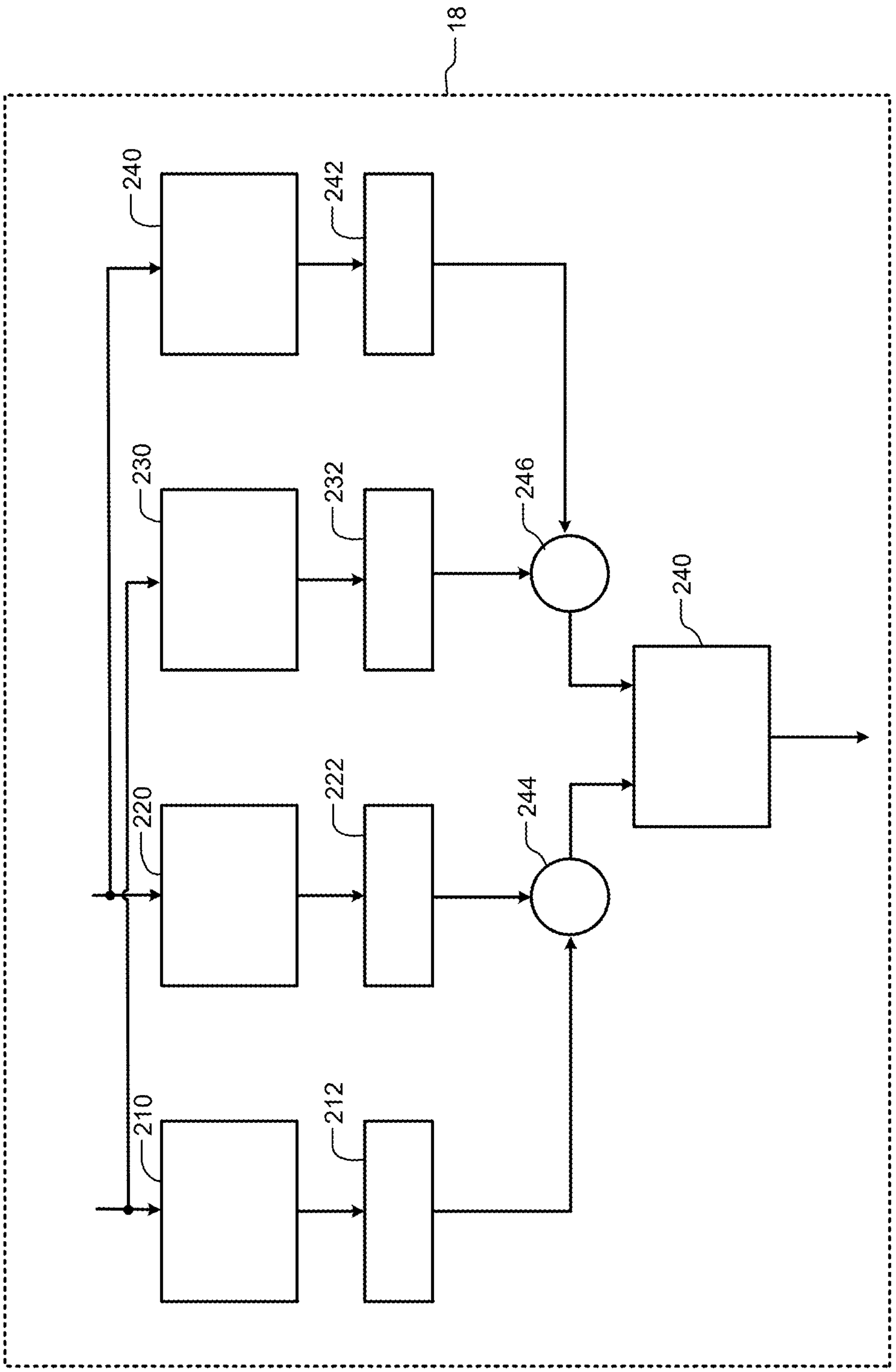

In FIG. 2B, the first RWA angle and the second RWA angle are summed by a summer 244 before being input to the RWA controller 240. The first RWA velocity and the second RWA velocity are summed by a summer 246 before being input to the RWA controller 240. In some examples, the RWA controller 240 applies a mathematical function, filter, or other modifier to the summed RWA angle and the summed RWA velocity to generate the RWA angle and the RWA velocity.

Figure 3A:
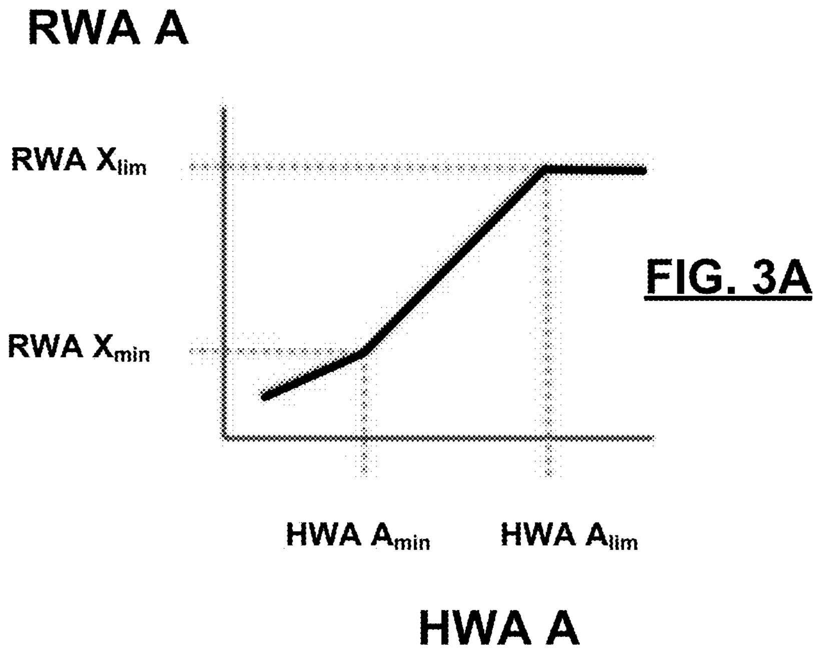
FIG. 3A is a graph illustrating an example of a RWA angle response based on HWA angle according to the present disclosure.

Referring now to FIGS. 3A to 3D, examples of RWA angle and/or RWA velocity responses that are based on HWA angle and/or HWA torque are shown. In FIG. 3A, a relationship between the first RWA angle and the HWA angle is shown. A first RWA angle value ($X_{min}$) corresponds to a first HWA angle value (HWA $A_{min}$) (corresponding to the predetermined HWA angle such as +/−150°).

A second RWA angle value (RWA $X_{lim}$) corresponds to the RWA angle limit (at an HWA angle limit) (HWA $A_{lim}$). As can be seen, the RWA angle response between the first HWA angle value and the second HWA angle value is different than the RWA angle response below the first HWA angle value. For example, the slope is increased to provide increased RWA angular response when the steering angle is above the first HWA angle.

Figure 3B:
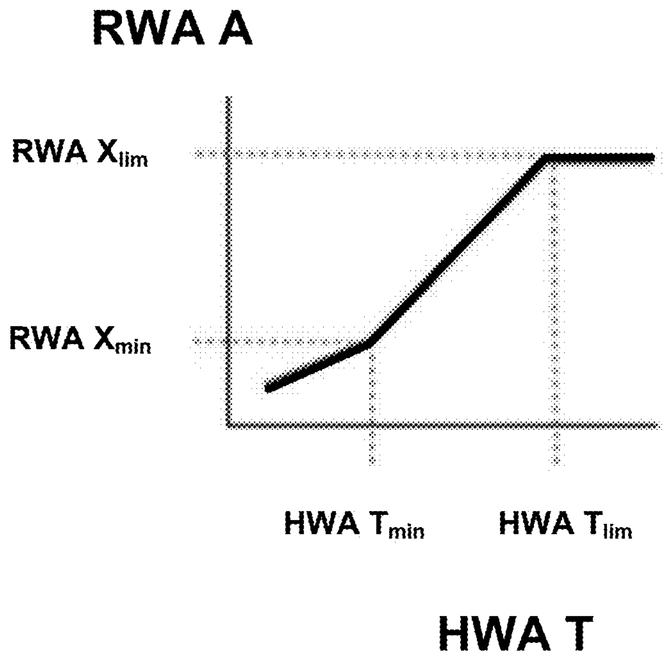
FIG. 3B is a graph illustrating an example of a RWA angle response based on HWA torque according to the present disclosure.

In FIG. 3B, a relationship between the first RWA angle and the HWA torque is shown. A first RWA angle value ($X_{min}$) corresponds to the first HWA torque value (HWA $T_{min}$). The second RWA angle value (RWA $X_{lim}$) corresponds to the RWA angle limit (at an HWA torque limit) (HWA $T_{lim}$). As can be seen, the RWA angle response between the first HWA torque value and the second HWA torque value is different than the RWA angle response below the first HWA torque value.

Figure 3C:
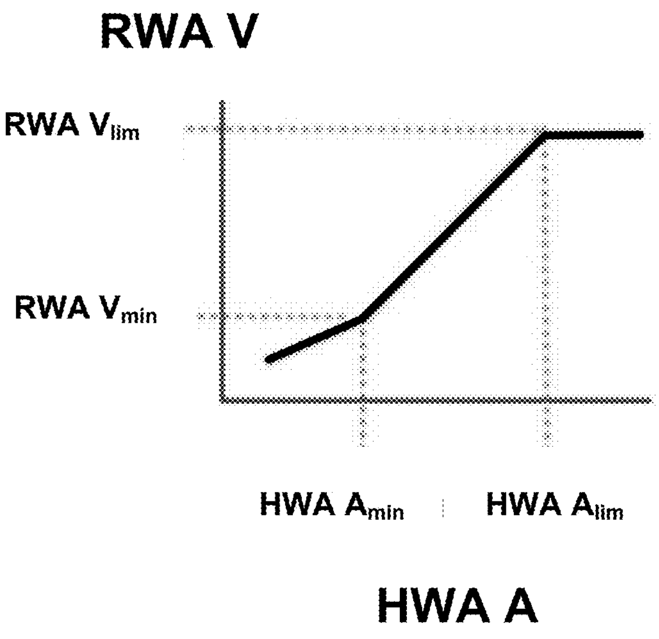
FIG. 3C is a graph illustrating an example of a RWA velocity response based on HWA angle according to the present disclosure.

In FIG. 3C, a relationship between the first RWA velocity and the HWA angle is shown. A first RWA velocity value ($V_{min}$) corresponds to the first HWA angle value (HWA $A_{min}$). The second RWA velocity value (RWA $V_{lim}$) corresponds to the RWA velocity limit (at an HWA angle limit) (HWA $A_{lim}$). As can be seen, the RWA velocity response between the first HWA angle value and the second HWA angle value is different than the RWA angle response below the first HWA angle value.

Figure 3D:
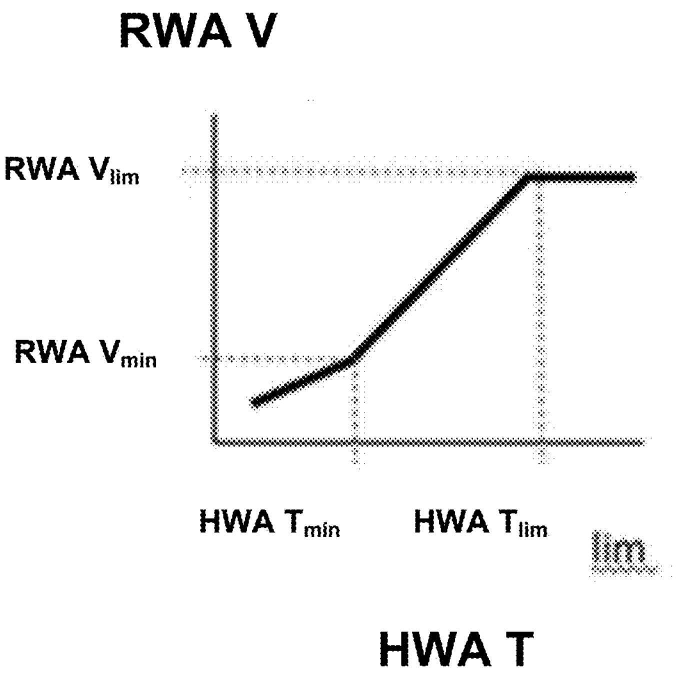
FIG. 3D is a graph illustrating an example of a RWA velocity response based on HWA torque according to the present disclosure.

In FIG. 3D, a relationship between the first RWA velocity and the HWA torque is shown. A first RWA velocity value ($V_{min}$) corresponds to the first HWA torque value (HWA $T_{min}$). The second RWA velocity value (RWA $V_{lim}$) corresponds to the RWA velocity limit (at an HWA torque limit) (HWA $T_{lim}$). As can be seen, the RWA velocity response between the first HWA torque value and the second HWA torque value is different than the RWA angle response below the first HWA torque value.

Figure 4:
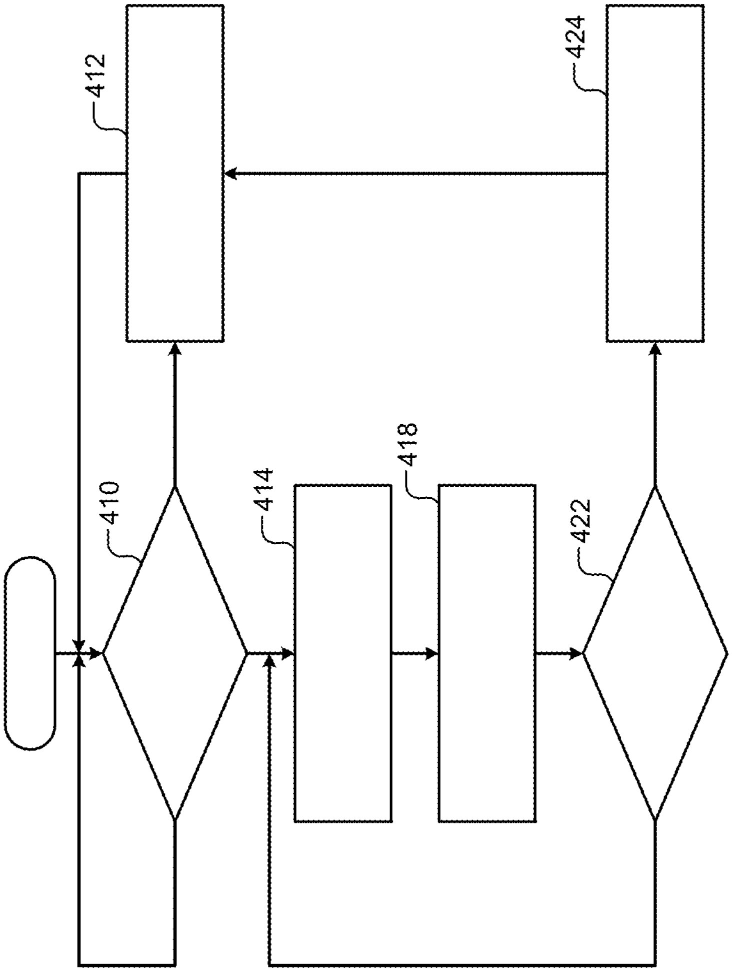
FIG. 4 is a flowchart of an example of a method for controlling steering of a vehicle according to the present disclosure.

Referring now to FIG. 4, a method for controlling steering is shown. At 410, the method determines whether entry enabling criteria are met. In some examples, the entry enabling criteria includes one or more parameters selected from a group consisting of HWA angle greater than an absolute value of the first predetermined angle (e.g., an angle in a range from 140° to 180° (e.g., 150°)), HWA torque greater than a first predetermined torque (e.g., torque in a range from 3 to 8 Nm (e.g., 5 Nm), ESC is active, wheel angle is less than an absolute value of a second predetermined angle (e.g., an angle in a range from 25° to 35° (e.g., 30°), and/or vehicle speed is greater than a first predetermined speed (e.g., a speed in a range from 8 to 20 kph (e.g., 10 kph). In some examples, the entry enabling criteria requires all of the parameters to be met. In other examples, a subset of these enabling criteria and/or other enabling criteria can be used.

If 410 is false, a normal steering response is used. If 410 is true, the method continues to 414 and optionally enables an end of travel HWA force feedback zone. For example, increased force feedback may be used in a second angle range as compared to a first angle range (used when one or more of the enabling criteria are not met). At 418, the method enables end of travel HWA projected control of the RWA.

At 422, the method determines whether disabling criteria are met. In some examples, the disabling criteria includes one or more parameters selected from a group consisting of an absolute value of HWA angle less than a third predetermined angle, the HWA torque less than a second predetermined torque, electronic stability control (ESC) is inactive, an absolute value of wheel angle is less than a fourth predetermined angle, and/or the vehicle speed is less than a second predetermined speed. In some examples, the exit enabling criteria is met if any of the parameters are not met. In some examples, the third predetermined angle is the same as the first predetermined angle, the second predetermined torque is the same as the first predetermined torque, the fourth predetermined angle is the same as the second predetermined angle, and/or the second predetermined speed is the same as the first predetermined speed.

In other examples, one or more of the disabling criteria are different to provide hysteresis. In other words, the third predetermined angle is less than the first predetermined angle, the second predetermined torque is the less than the first predetermined torque, the fourth predetermined angle is less than the second predetermined angle, and/or the second predetermined speed is less than the first predetermined speed.

If 422 is false, the method returns to 414 and 418. If 422 is true, the method continues with 424 where synchronization to the normal steering response occurs. The method continues with 412.

Figure 5:
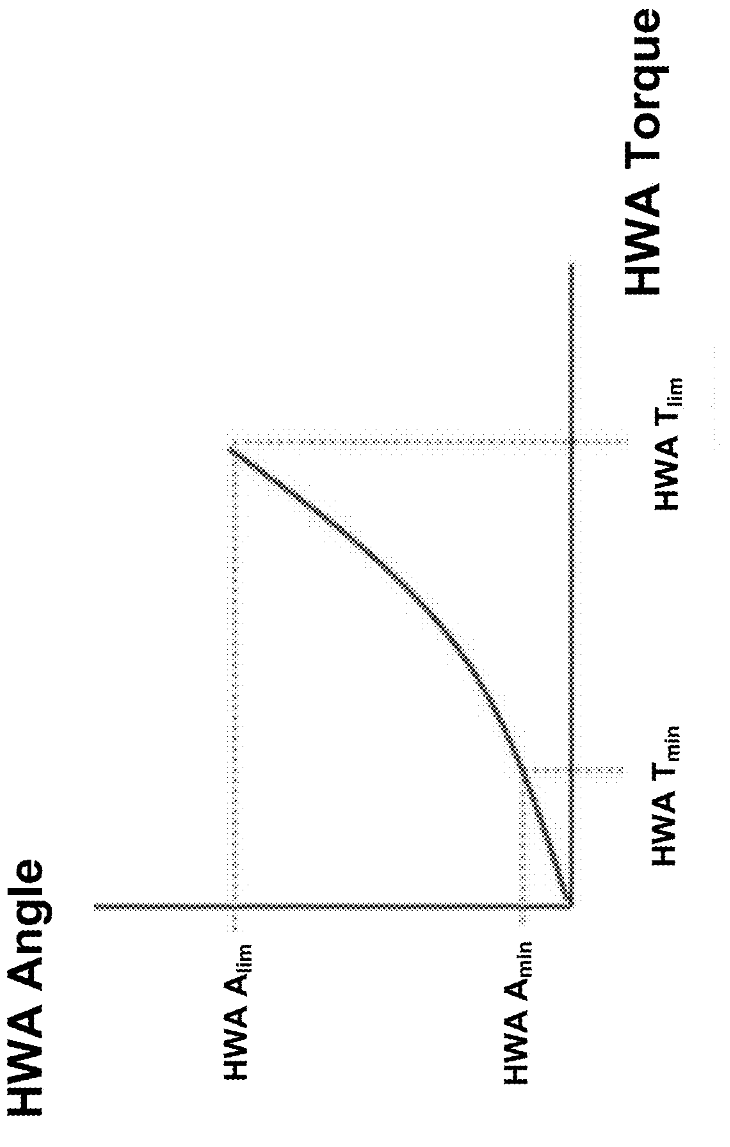
FIG. 5 is a graph illustrating an example of HWA angle as a function of HWA torque for force feedback according to the present disclosure.

Referring now to FIG. 5, HWA angle between HWA $A_{min}$ and HWA $A_{lim}$ is shown as a function of HWA torque. As can be seen, the force feedback on the HWA increases with increasing HWA angle.

Based on the foregoing, the HWA and the RWA of the steering control system can be controlled with a projected response when the enabling criteria are met. At the end of HWA rotation, a limited amount of HWA rotational angle and/or torque is used to control the RWA angle and/or velocity. RWA velocity is controlled using HWA angle and/or HWA torque. In some examples, two to four or more control methods are blended together using gain factors.

Enabling and disabling criteria include thresholds to begin and stop the projected control of the RWA. The force feedback zone provides the driver with tactile feedback during movement of the HWA to help control the road wheel angles. In some examples, control of the RWA includes a hysteresis loop. In some examples, the RWA limits travel at a rotational position that is at or less than the maximum mechanical travel of the RWA.

The steering control system enables road wheels of the vehicle to be controlled using a steering device such as a yoke having a limited rotational range. By projecting the driver's torque and angle inputs onto the HWA, the RWA's movement can be controlled to provide additional road wheel angle. The steering control system is particularly useful in certain driving situations such as a stability control events. For example, when operating the vehicle on a track or on a slippery surface, the driver may need to rotate the steering wheel or yoke quickly to prevent the vehicle from spinning.

The steering control module allows yoke-like steering wheels to be used. Yoke-like steering wheels are cumbersome to rotate more 180° (without a top or bottom bar for the driver providing a location for the driver to grab). When driving on track, drivers attempting to control the vehicle during a stability control event with the ESC turned off with limited HWA rotation were unable to prevent the spin. The HWA and RWA are misaligned and are synchronized after the projected steering control has finished.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A steering control system for a vehicle, comprising:
- a first sensor configured to sense an HWA angle of a hand wheel actuator (HWA);
- a second sensor configured to sense an HWA torque of the HWA;
- a steering controller configured to:
  - receive the HWA angle and the HWA torque; and
  - when the HWA angle is greater than a predetermined HWA angle, perform at least two of:
    - use a first model or lookup table to generate a first road wheel actuator (RWA) angle in response to the HWA angle;
    - use a second model or lookup table to generate a second RWA angle in response to the HWA torque;
    - use a third model or lookup table to generate a first RWA velocity in response to the HWA angle;
    - use a fourth model or lookup table to generate a second RWA velocity in response to the HWA torque; and
- a RWA controller configured to determine at least one of a RWA angle and a RWA velocity of the RWA in response to at least two of the first RWA angle multiplied by a first gain, the second RWA angle multiplied by a second gain, the first RWA velocity multiplied by a third gain, and the second RWA velocity multiplied by a fourth gain.

2. The steering control system of claim 1, wherein at least one of the steering controller and the RWA controller is configured to sum the first RWA angle and the second RWA angle.

3. The steering control system of claim 1, wherein at least one of the steering controller and the RWA controller is configured to sum the first RWA velocity and the second RWA velocity.

4. The steering control system of claim 1 wherein the RWA controller is configured to generate the RWA angle and the RWA velocity in response to the first RWA angle multiplied by the first gain, the second RWA angle multiplied by the second gain, the first RWA velocity multiplied by the third gain, and the second RWA velocity multiplied by the fourth gain.

5. The steering control system of claim 4, wherein:
- at least one of the steering controller and the RWA controller is configured to sum the first RWA angle and the second RWA angle; and
- at least one of the steering controller and the RWA controller is configured to sum the first RWA velocity and the second RWA velocity.

6. The steering control system of claim 1, wherein the steering controller is configured to monitor enabling criteria and to enable use of the first model or lookup table, the second model or lookup table, the third model or lookup table, and the fourth model or lookup table when the enabling criteria are met.

7. The steering control system of claim 6, wherein:
- the steering controller is configured to monitor disabling criteria and to disable use of the first model or lookup table, the second model or lookup table, the third model or lookup table, and the fourth model or lookup table when the disabling criteria are met; and
- wherein at least one parameter of the disabling criteria is selected to provide hysteresis.

8. The steering control system of claim 6, wherein the enabling criteria include two or more selected from a group consisting of:
- an absolute value of the HWA angle is greater than a first predetermined angle,
- the HWA torque is greater than a predetermined torque,
- an electronic stability control module is active,
- an absolute value of a road wheel angle is less than a second predetermined angle, and
- vehicle speed is greater than a predetermined speed.

9. The steering control system of claim 8, wherein the predetermined speed is in a range from 8 to 20 kilometers per hour (kph).

10. The steering control system of claim 8, wherein the absolute value of the first predetermined angle is in a range from 140° to 180°.

11. The steering control system of claim 8, wherein the predetermined torque is in a range from 3 to 8 Nm.

12. The steering control system of claim 8, wherein the absolute value of the second predetermined angle is in a range from 25° to 35°.

13. The steering control system of claim 6, wherein the enabling criteria includes:

an absolute value of the HWA angle is greater than a first predetermined angle, the HWA torque is greater than a predetermined torque, an electronic stability control module is active, an absolute value of a road wheel angle is less than a second predetermined angle, and vehicle speed is greater than a predetermined speed.

14. The steering control system of claim 13, wherein:

the predetermined speed is in a range from 8 to 20 kilometers per hour (kph), and the absolute value of the first predetermined angle is in a range from 140° to 180°.

15. The steering control system of claim 13, wherein:

the predetermined torque is in a range from 3 to 8 Nm, and the absolute value of the second predetermined angle is in a range from 25° to 35°.

16. The steering control system of claim 1, further comprising a feedback motor configured to adjust feedback on the HWA when the HWA angle is greater than a predetermined HWA angle.

17. A steering control system for a vehicle, comprising:

a first sensor configured to sense a hand wheel actuator (HWA) angle;

a second sensor configured to sense an HWA torque;

a steering controller configured to:

receive the HWA angle and the HWA torque; and when the HWA angle is greater than a predetermined HWA angle and enabling criteria are met:

use a first model or lookup table to generate a first road wheel actuator (RWA) angle in response to the HWA angle;

use a second model or lookup table to generate a second RWA angle in response to the HWA torque;

use a third model or lookup table to generate a first RWA velocity in response to the HWA angle; and use a fourth model or lookup table to generate a second RWA velocity in response to the HWA torque; and a RWA controller configured to determine a RWA angle and a RWA velocity in response to the first RWA angle multiplied by a first gain, the second RWA angle multiplied by a second gain, the first RWA velocity multiplied by a third gain, and the second RWA velocity multiplied by a fourth gain.

18. The steering control system of claim 17, wherein at least one of the steering controller and the RWA controller is configured to sum the first RWA angle and the second RWA angle and to sum the first RWA velocity and the second RWA velocity.

19. The steering control system of claim 17, wherein:

the steering controller is configured to monitor disabling criteria and to disable use of the first model or lookup table, the second model or lookup table, the third model or lookup table, and the fourth model or lookup table when the disabling criteria are met, and wherein at least one parameter of the disabling criteria is selected to provide hysteresis.

20. The steering control system of claim 17, further comprising a feedback motor configured to adjust feedback on the HWA when the HWA angle is greater than a predetermined HWA angle.

* * * * *